(No Model.)
J. WALRATH.
GAGE FOR SAW MILLS.
No. 291,558. Patented Jan. 8, 1884.
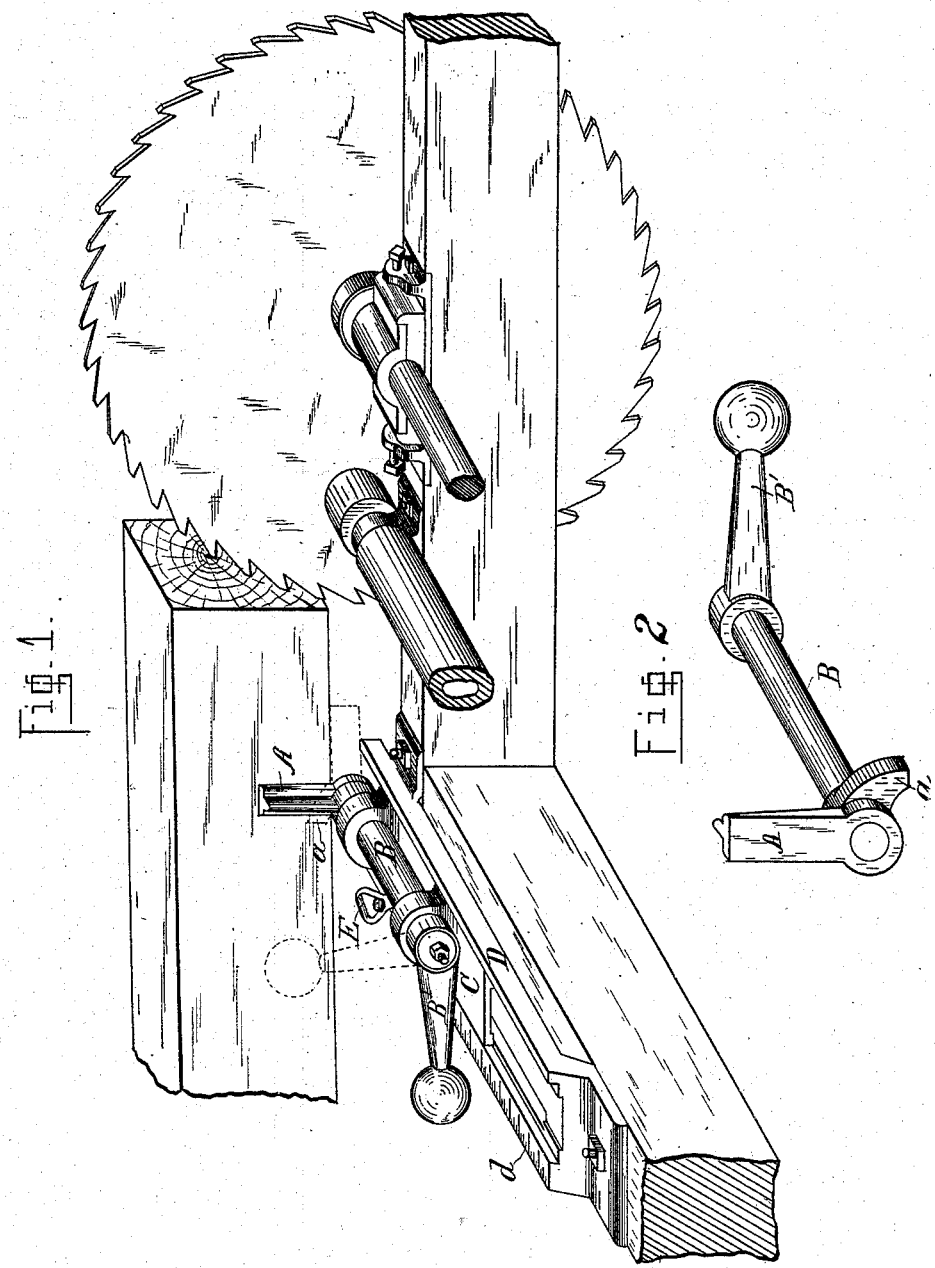

UNITED STATES PATENT OFFICE.

JESSE WALRATH, OF RACINE, WISCONSIN.

GAGE FOR SAW-MILLS.

SPECIFICATION forming part of Letters Patent No. 291,558, dated January 8, 1884.

Application filed July 25, 1883. (No model.)

*To all whom it may concern:*

Be it known that I, JESSE WALRATH, a citizen of the United States, residing at Racine, in the county of Racine and State of Wisconsin, have invented certain new and useful Improvements in Gages for Saw-Mills; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

This invention relates to gages for saw-mills. Heretofore these gages, when once adjusted, were rigid and unyielding. In sawing up logs it frequently happens that the log temporarily runs slightly out of a true plane with respect to the saw. When that occurs, great strain is put on the machinery, and particularly a pinching or cramping strain on the saw, often to its great injury. My improvement is designed to obviate these strains, occasioned when the log is not moving or feeding true; and it consists of the introduction of a yielding gage in place of the ordinary unyielding one, said yielding gage being so mounted that it may rock on an axis at right angles to its face.

In order that my invention may be clearly understood, I have illustrated in the annexed drawings, and will proceed to describe the best form thereof at present known to me.

Figure 1 illustrates in perspective so much of a circular-saw mill as is necessary for exhibiting my invention. Fig. 2 is a perspective view of the gage with its shaft and weighted arm detached.

The same letters of reference indicate identical parts in all the figures.

The gage A is an upright knee, formed on or secured to one end of a shaft, B, which is journaled in suitable bearings on a slide, C, mounted in a guide, D, which is secured to one of the cross-timbers of the saw-mill frame. The gage is arranged at a suitable distance in advance of the saw, as usual. The shaft B is provided with a weighted arm, B', which projects from it at about right angles to the knee-gage A. This weighted arm normally holds shaft B in such a position that the knee-gage stands erect, as shown in full lines in Fig. 1; but in case any unusual lateral pressure is brought to bear on the face of the knee-gage by the log, as will occur when the log is fed slightly out of a true plane with respect to the saw, the log will turn the knee-gage forward, turning its shaft in its bearings until it assumes a position indicated by dotted lines in Fig. 1, so as to entirely clear the log, which will then move on over the top of the knee-gage until the log is again fed true, when the shaft and knee-gage will be turned back to their original position by the action of the weighted lever B'. The weighted lever may be fixed to the shaft at any point. A spring may be used in lieu of the weighted lever. The hub of the knee-gage is constructed with a laterally-projecting finger, *a*, which in this case performs the duty of arresting the turning of the shaft by its weighted lever, and the further duty of an index-finger to the scale *d* on one of the top bars of the guide D. The slide C, adjustable on the guide D, is secured at any desired point by clamping-screw and nut E.

What I claim as my invention is—

1. The combination, substantially as before set forth, of a saw-mill gage mounted on a journaled shaft at right angles to its face, and a weighted arm on the shaft, whereby the gage is held normally erect, but allowed to yield in the direction of the feed.

2. The combination, substantially as before set forth, of the gage, the journaled shaft on one end of which it is mounted, the combined stop and index-finger connected with the gage, the fixed scale, and the weighted arm on the shaft.

In testimony whereof I affix my signature in presence of two witnesses.

JESSE WALRATH.

Witnesses:
CHARLES H. LEE,
WALTER B. DUTTON.